United States Patent [19]
Middleton

[11] Patent Number: 5,201,139
[45] Date of Patent: Apr. 13, 1993

[54] FISH HOOK REMOVER

[76] Inventor: Forest L. Middleton, C-1506 Barlow Lake, Middleville, Mich. 49333

[21] Appl. No.: 940,285

[22] Filed: Sep. 3, 1992

[51] Int. Cl.$^5$ .............................................. A01K 97/00
[52] U.S. Cl. ................................... 43/53.5; 294/26
[58] Field of Search ................... 43/53.5, 4, 5; 7/106; 294/26

[56] References Cited

U.S. PATENT DOCUMENTS

| | | | |
|---|---|---|---|
| Re. 24,902 | 7/1957 | Dillard | 43/53.5 |
| D. 197,775 | 3/1964 | Edgington | D31/4 |
| D. 227,759 | 7/1973 | Enagureto | D22/5 |
| 400,112 | 3/1889 | Post | 43/53.5 |
| 1,208,671 | 12/1916 | Severtsen | 43/53.5 |
| 1,777,695 | 10/1930 | Jeffery | 43/53.5 |
| 2,289,810 | 7/1942 | Tallmadge | 43/53.5 |
| 2,294,758 | 9/1942 | Manske | 43/53.5 |
| 2,507,083 | 5/1950 | Anderson | 43/53.5 |
| 2,512,818 | 6/1950 | Wikarski | 43/53.5 |
| 2,537,879 | 1/1951 | Culhane, Jr. | 43/53.5 |
| 2,578,289 | 12/1951 | Danielson | 43/53.5 |
| 2,669,055 | 2/1954 | Doerr | 43/53.5 |
| 2,688,816 | 9/1954 | Bondesen | 43/53.5 |
| 2,749,653 | 6/1956 | Patrowsky | 43/53.5 |
| 2,795,887 | 6/1957 | Lockert | 43/53.5 |
| 2,836,003 | 5/1958 | Schumacker | 43/53.5 |
| 2,847,793 | 8/1958 | Breer | 43/53.5 |
| 2,892,284 | 6/1959 | Shawhan | 43/53.5 |
| 2,947,106 | 8/1960 | Lewan | 43/53.5 |
| 3,001,320 | 9/1961 | Sonner, Jr. | 43/53.5 |
| 3,011,286 | 12/1961 | Wallace | 43/53.5 |
| 3,034,252 | 5/1962 | Basinski | 43/53.5 |
| 3,419,924 | 1/1969 | Archibald | 43/53.5 |
| 3,588,078 | 6/1971 | VanDeSande | 43/53.5 |
| 3,721,034 | 3/1973 | Collins | 43/53.5 |
| 4,014,131 | 3/1977 | Bendik | 43/53.5 |
| 4,342,171 | 8/1982 | Cripps | 43/53.5 |
| 4,590,702 | 5/1986 | Chestnutt | 43/53.5 |
| 4,833,817 | 5/1989 | Silverthorn | 43/53.5 |

Primary Examiner—Richard K. Seidel
Assistant Examiner—James Miner
Attorney, Agent, or Firm—Price, Heneveld, Cooper, Dewitt & Litton

[57] ABSTRACT

A fish hook removal tool for disengaging a fish hook from the mouth and throat of a fish, formed of an elongated, stamped, J-shaped metal sheath including an elongated barrel portion having an outer end, and a curved handle portion integral with the barrel portion, and having a U-shaped cross section, an elongated spring wire retained in the sheath having a curved portion with a free configuration greater in arcuate extent than the sheath handle portion, but being restrained within the handle portion, the spring wire having an elongated linear portion extending the length of the barrel portion, a U-shaped end extending out the outer end of the barrel portion, and a trigger portion extending out of the barrel portion from the linear wire portion to the curved wire portion, the sheath having a stop on the barrel portion where the wire extends therefrom to limit the amount the U-shaped wire extension extends out of the barrel portion. The sheath has a retraction stop near to and spaced from the barrel portion outer end for limiting retraction of the wire relative to the barrel portion when the trigger portion is shifted. The outer barrel end has laterally spaced, axially offset side walls and has fish hook receiving concavities.

5 Claims, 1 Drawing Sheet

FISH HOOK REMOVER

BACKGROUND OF THE INVENTION

This invention relates to fish hook removal tools and particularly to a two-piece, metal fish hook remover of unique construction.

A variety of hook removal tools have been proposed heretofore. Some of them appear quite useful, but typically are not susceptible to easy, inexpensive manufacture so as to be practical.

SUMMARY OF THE INVENTION

An object of this invention is to provide a novel, practical fish hook removal tool not only effective and easy to use, but also capable of production manufacture. The unit employs easy spring action with a trigger, using one hand, to safely and surely remove a fish hook from the mouth of a fish, even if the hook is down in the throat of the fish. The unit is composed of two simple parts, one being a stamped J-shaped metal sheath and the other being a spring wire with a trigger to retract the wire into locking relationship with the end of the sheath. These and other objects, features and advantages of the invention will become apparent upon studying the following specification in conjunction with the drawings.

DESCRIPTION OF THE PREFERRED EMBODIMENT

Referring now specifically to the drawings, the complete fish hook removal tool 10 there illustrated is made up of two components, a stamped metal sheath 12 and a spring wire 14.

Figure 3:
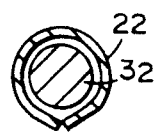
FIG. 3 is a sectional view taken on plane III—III of FIG. 1.
Figure 4:
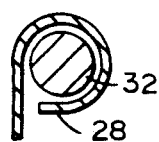
FIG. 4 is a sectional view taken on plane IV—IV of FIG. 1.
Figure 5:
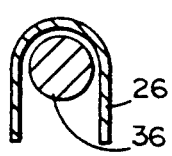
FIG. 5 is a sectional view taken on plane V—V of FIG. 1.

The stamped metal sheath 12 is an elongated, stamped, J-shaped, sheet metal component including an elongated barrel portion 22 having an outer end 24, and a curved handle portion 26 at one end of the barrel portion and integral therewith. The sheath has a U-shaped cross section in the handle portion (FIG. 5), a closed leg U-shaped configuration in the barrel portion (FIG. 3), a spring stop 30 where the spring wire extends out of the sheath, and a locking tab 28 formed of one leg of the U-shaped portion, near to but spaced from the outer barrel end 24 (FIG. 4).

Figure 6:
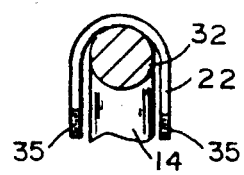
FIG. 6 is a fragmentary end view, partially in section, of the barrel portion.
Figure 7:
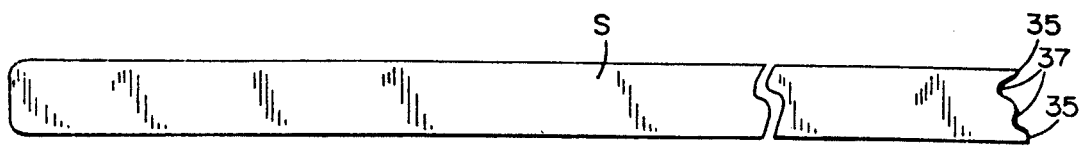
FIG. 7 is a top plan view of a metal stamping prior to its being deformed into the sheath forming one of the two components of the unit in FIGS. 1–6.

This metal sheath is formed from an original stamping of a planar, elongated, sheet metal piece. This is formed into the J-shaped configuration having a generally U-shaped cross section by a sequence of bending steps. This provides the U-shaped configuration in the handle (FIG. 5) and at the outer end of the barrel portion (FIG. 6), the locking tab 28 (FIG. 4) and the closed U configuration in most of the barrel (FIG. 3). The outer end of the stamping in FIG. 6 is provided with a pair of adjacent concavities 37, one for each lateral side of the final configuration, with the angle between each concavity 37 and the outer edge of the blank being at a small acute angle of about 15 degrees, to form a pair of side edge protrusions 35. One lateral side of these walls is axially extended relative to the other one, preferably by about one-tenth inch, such that one concavity 37 and its adjacent protrusion 35 extend axially beyond the other concavity and protrusion. Thus, when the unit is formed into its final configuration the one wall and its concavity are axially offset from the other wall and concavity, for reasons explained hereinafter. Between the concavities 37 is a central protrusion 39.

The long spring wire element 14 includes an elongated portion 32 which extends within and along barrel portion 22, with its outer end extending beyond the barrel portion and forming a U-shaped end 34, the mouth of which is in the plane of concavities 37. The spring wire and this U-shaped end are in a plane which bisects the generally U-shaped sheath. Thus when the unit is held vertically in the orientation depicted in FIG. 1, wire end 34 will also lie in a vertical plane. The opposite end of spring wire 14 is in a U-shaped configuration at 36, lying within the U-shaped handle 26 of the sheath. This portion of the spring wire has a free shape (see dash lines in FIG. 1) which is larger in radius and diameter, i.e. arcuate extent, than that of sheath handle 26. The sheath thus retains the spring wire compressed within the U-shaped handle to produce a bias on the wire toward the barrel. Between the wire portion within the handle and the long wire portion within the barrel is a trigger portion which extends across the opening of the U-shaped member. This trigger portion 38 preferably has an upper section which is generally vertical and a lower section which protrudes at an obtuse angle to the upper section where it joins at an acute angle the U-shaped portion that fits within the sheath handle. The inherent bias of the wire causes it to be biased against the stop 30 formed in the sheath and abutted by trigger portion 14.

Figure 1:
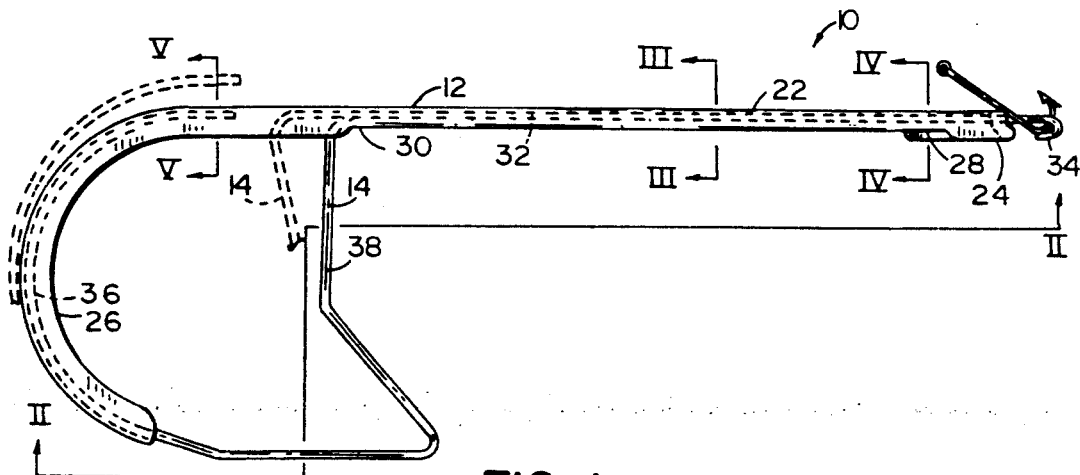
FIG. 1 is a side elevational view of the novel fish hook removal tool.
Figure 2:
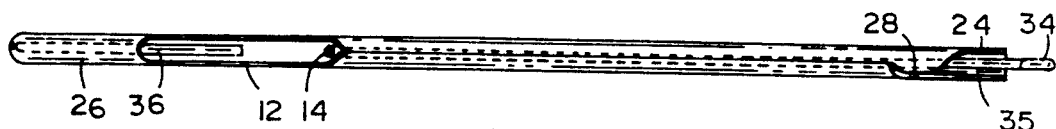
FIG. 2 is a fragmentary bottom view of the tool in FIG. 1.

With this configuration the structure can be readily manipulated with one hand, to retract the spring wire from its extended, normal position shown in solid lines in FIG. 1 to its retracted position (FIG. 1) shown in phantom lines at 14. This retraction enables the outer loop 34 of the spring wire to be drawn tightly against and into locking relationship with outer end 24 of the sheath. The axially offset walls of the outer end 24 cause a fish hook to be locked securely laterally in concavities 37, while the protrusions 35 on opposite sides prevent the fish hook from being released inadvertently.

In use the device can be readily inserted within the mouth of the fish to enable loop 34 to be placed around the hook and then retracted crosswise into locking relationship with concavities 37 in end 24, at which point the entire tool can be pushed inwardly of the mouth of the fish to release the fish hook from the fish, and then pulled back out to retract the fish hook.

The device has been found extremely useful and effective. Moreover, it can be readily manufactured on a mass production basis at a relatively low cost, so as to be totally practical.

It is conceivable that certain minor variations may be made in the unit disclosed and described as the preferred embodiment without departing from the inventive concept. Therefore, the invention is intended to be limited only by the scope of the appended claims and the reasonably equivalent structures to those defined therein, rather than to the specific preferred embodiment set forth as exemplary of the invention.

The embodiments of the invention in which an exclusive property or privilege is claimed are defined as follows:

1. A fish hook removal tool for disengaging a fish hook from the mouth and throat of a fish, comprising:
    an elongated, stamped, J-shaped metal sheath including an elongated barrel portion having an outer end, and a curved handle portion integral with said barrel portion;
    said sheath having a U-shaped cross section in said handle portion;
    an elongated spring wire retained in said sheath, having a curved portion with a free configuration greater in arcuate extent than said sheath handle portion, but being restrained within said handle portion, said spring wire having an elongated linear portion extending the length of said barrel portion, a U-shaped end extending out said outer end of said barrel portion, and a trigger portion extending out of said barrel portion from said linear wire portion to said curved wire portion;
    said sheath having a stop on said barrel portion where said wire extends therefrom, to limit the amount said U-shaped end extends out of said barrel portion.

2. The fish hook removal tool in claim 1 wherein said sheath has a retraction stop near to and spaced from said barrel portion outer end for limiting retraction of said wire relative to said barrel portion, when said trigger portion is shifted.

3. The fish hook removal tool in claim 2 wherein said outer barrel end has a pair of laterally spaced side walls, one of said side walls being axially offset relative to the other wall.

4. The fish hook removal tool in claim 1 wherein said outer barrel end has a pair of side walls each having an axial concavity therein for cooperatively retaining a fish hook with said U-shaped end when retracted.

5. The fish hook removal tool in claim 4 wherein said trigger portion has an upper part normal to said barrel portion and a lower part at an obtuse angle to said upper part.

* * * * *